Jan. 28, 1958   R. H. MULLER   2,821,367
RECOVERY OF HIGH PRESSURE FLUID IN ROTARY HEAT EXCHANGER
Filed Oct. 27, 1954   2 Sheets-Sheet 1
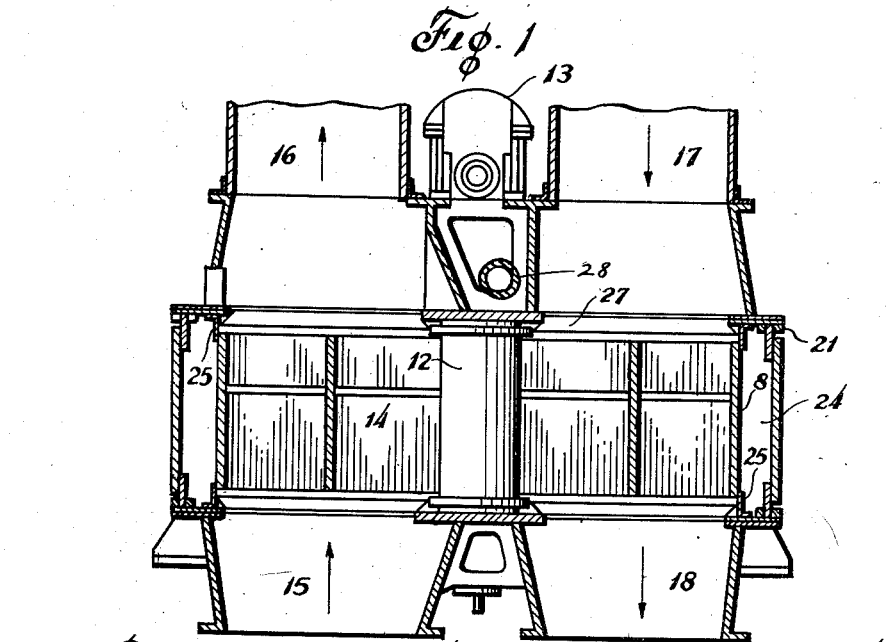
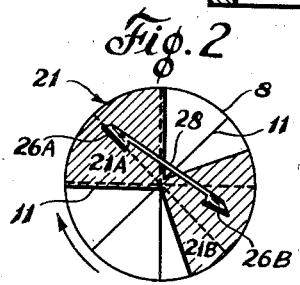
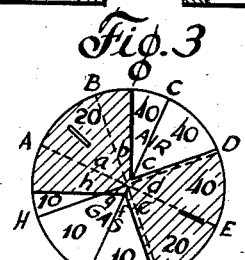
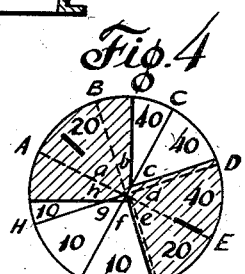
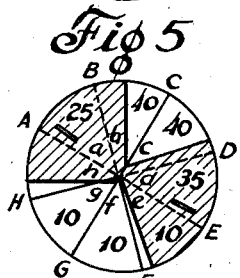
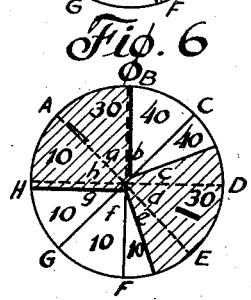
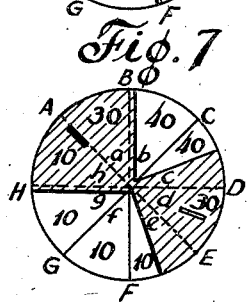
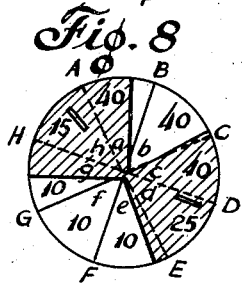
INVENTOR.
Robert H. Muller
BY 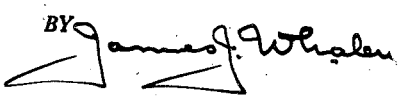
ATTORNEY

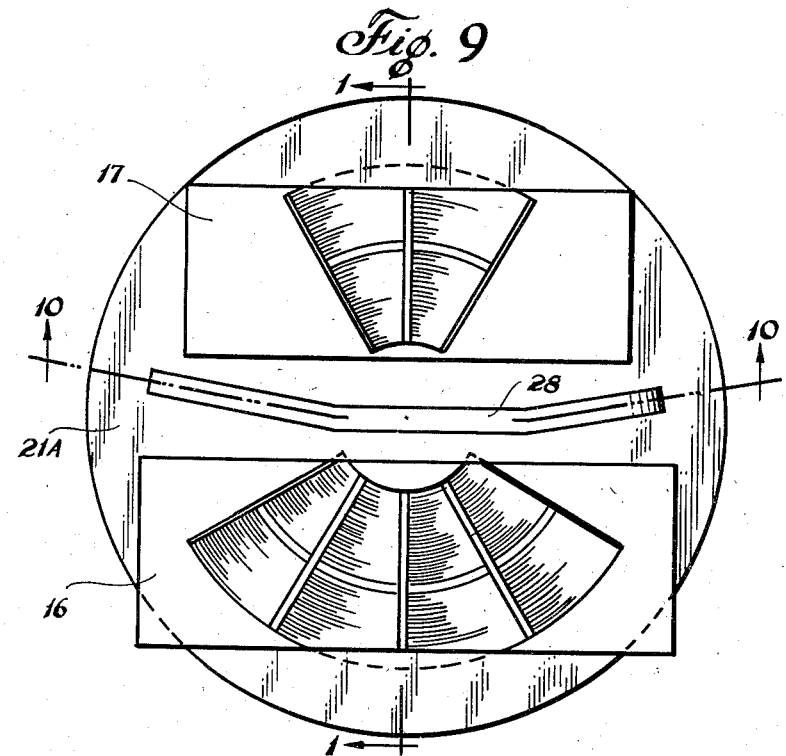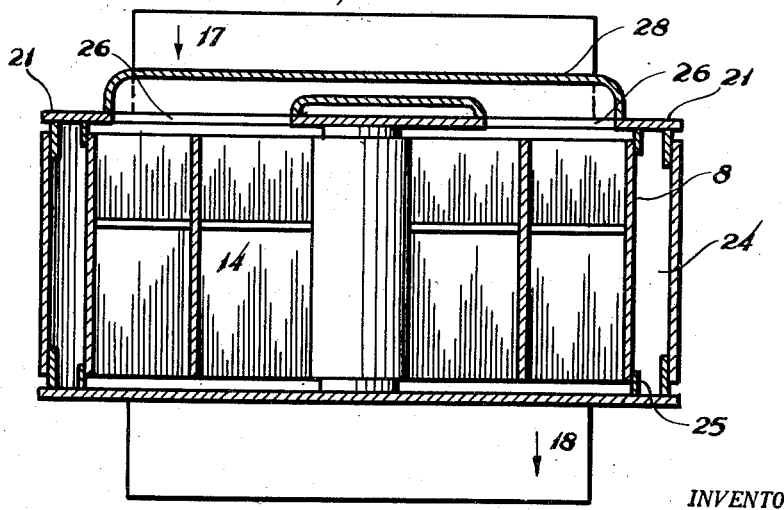

United States Patent Office

2,821,367
Patented Jan. 28, 1958

2,821,367

RECOVERY OF HIGH PRESSURE FLUID IN ROTARY HEAT EXCHANGER

Robert H. Muller, Wellsville, N. Y., assignor to The Air Preheater Corporation, New York, N. Y., a corporation of New York Application October 27, 1954, Serial No. 465,103

6 Claims. (Cl. 257—6)

The present invention relates to heat exchange apparatus and in particular to an arrangement for improving the operating efficiency of a heat exchanger of the rotary regenerative type.

In a rotary regenerative heat exchanger a mass of heat exchange material carried in a rotor is first positioned in a gas passage to absorb heat from the gas passing therethrough and then upon turning of the rotor the heat exchange material is positioned in a fluid passage where it is free to impart heat to the fluid passing therethrough. Frequently the fluid to be heated is compressed air so that when a portion of the rotor leaves the air passageway and moves into the low pressure gas passageway the air entraped in the rotor expands, into the gas and displaces a large amount of gas and also results in the loss of a large portion of the work required to compress the air.

It is therefore an object of this invention to provide a construction which will substantially reduce the transportation of air from the air passageway to the flue gas pasageway and at the same time reduce the amount of direct leakage between the high pressure air stream and the lower pressure gas stream by providing areas of intermediate pressure therebetween.

The invention will be best understood from the following description when considered in connection with the accompanying drawings forming a part thereof and in which:

Figure 1 diagrammatically represents a sectional elevation of a rotary regenerative air preheater of the type embodying the present invention.

Figure 2 diagrammatically represents a top plan view of a rotor having a slotted sector plate connected by duct means.

Figures 3 to 8 inclusive diagrammatically illustrate sequential phases in the rotation of a rotor with respect to a fixed end or sector plate.

Figure 9 is a diagrammatic plan view of a rotary heat exchanger embodying the invention.

Figure 10 is a sectional view on the line 10—10 in Figure 9.

In the drawings, the numeral 8 designates a cylindrical shell of a rotor that is divided into sector shaped compartments by radial partitions 11 connecting it with the rotor post 12 which is driven by a motor and reduction gearing 13 to turn the rotor slowly about its axis. The rotor compartments contain regenerative heat transfer material such as metallic plates 14 which absorb heat from hot gases entering the preheater through a duct 15 connected to a turbine exhaust or other source of heat. As the rotor turns slowly about its axis, the heated plates 14 are moved into a stream of compressed air admitted through a duct 17 where they give up their heat to the air. After passing over the plates 14 and absorbing heat therefrom the stream of air is conveyed through outlet 18 to a hot air inlet of a combustor, to a boiler or other point of usage.

In order that the streams of gas and air may not bypass the heat transfer surface 14 by flowing in the annular clearance space 24 between the rotor shell 8 and the enclosing housing 20 it is customary to provide on the shell 8 circumferential seals diagrammatically shown at 25 in Figure 1 which wipe against the end plates 21 or other parts of the housing so as to seal off the space 24 at both ends of the rotor. Radial seals 27 fixed to the radial diaphragms wipe against the imperforate portions of the end or sector plates 21 to preclude fluid flow from one sectorial compartment to another.

Figure 2 diagrammatically illustrates an end plate 21 superimposed on a rotor 8 divided into sector shaped compartments by radial diaphragms 11. Axially spaced from the rotor is a sector plate 21 which comprises a single plate having two imperforate sector shaped portions 21A and 21B of substantially equal size and each of which is ported by a radial slot 26 disposed midway between sides thereof radially aligned with the diaphragms 11. The opposite sector shaped portions are circumferentially displaced a distance which enables one portion to substantially cover two entire compartments of the rotor at the instant the other portion of the sector plate is covering one entire compartment and one-half of each adjacent compartment as illustrated in Figure 2. Since the slots 26 lie centered in the respective divisions of the sector plate it may be seen that one slot 26 is superimposed over a diaphragm 11 at the instant the second slot 26 is midway between a pair of adjacent diaphragms 11. A duct 28 connects the slots 26 so as to permit fluid flow between slots and an equalization of pressure in the sectors covered by the respective slots. Practical limitations make it feasible to use a slotted sector plate at one end of the rotor only. However, ported sector plates at opposite ends of the rotor would in no way alter the basic operation and would be entirely within the scope of this invention. Duct 28 is illustrated in Figure 2 only; however, it is to be understood that it must be present to provide means for equalizing the pressure in the respective compartments, and it is omitted from Figures 3 to 8 only as a matter of convenience.

In this arrangement, hot gas entering duct 15 flows over the elements 14 in the sectors of the gas side represented by numeral 10 in Figures 3 to 8. Heat from the gas is absorbed by the heating elements passing through the gas side after which they are carried by the turning rotor into contact with the cold compressed air entering the rotor housing through duct 17 and traversing the sectorial compartments represented by the numeral 40. The numeral 10 represents an average gas pressure existing in any of the compartments aligned with the gas duct 15 while numeral 40 represents an average air pressure in the diametrically positioned compartments when in alignment with the air duct 17.

As mentioned previously, any compressed air which remains in any of the sector shaped compartments of the rotor as they pass from communication with the air duct 17 to the gas duct 15 expands into the stream of gas with the resultant loss of work required for air compression. To avoid this loss of compressed air the bleed line 28 is employed to connect the slots 26 formed in opposite portions of the sector plate. Thus while sectors "b" and "c" of Figure 5 are in direct communication with the supply of compressed air, other sectors "e," "f," "g," and "h" are in direct communication with the supply of gas, and a pair of compartments "a" and "d" lying substantially opposite each other and intermediate the air and gas passageways are interconnected by means of the bleed line 28 to provide a pair of oppositely disposed compartments containing substantially equal pressures as illustrated in Figure 6.

By referring to Figures 3 to 8 of the drawing a complete cycle of operation may be graphically followed. In all conditions illustrated the rotor is turning in a clockwise direction, and as previously mentioned a duct 28 is at all times connecting the spaced slots 26 in order to equalize pressures between a pair of substantially opposite sectors.

Figures 3 to 8 illustrate a rotor in a rotary regenerative air preheater having hot gas flowing through the gas side at 10 p. s. i. and imparting heat to the heating elements carried by the rotor. Compressed air at 40 p. s. i. flows over the heated elements which lie in sectors aligned with the air inlet duct 17 and absorbs heat therefrom. The sectorial compartments "a" and "e" are shown as containing equal pressures of 20 p. s. i. since slots 26 interconnected by duct 28 permit complete equalization of pressure between the air side at 40 p. s. i. and the gas side at 10 p. s. i. As each sectorial compartment leaves the air stream, compressed air is entrapped therein by the imperforate portion of the sector plate 21B, and the pressure remains at substantially 40 p. s. i. as indicated in Figure 3 where the sector "d" is shown an instant before it is rotated into communication with slot 26B. Figure 4 shows the rotor shortly thereafter when it has rotated an additional amount sufficient to allow diaphragm E to move past the slot 26B. At this point a slot 26 is midway between diaphragms A and B over compartment "a" providing direct communication with the compartment "d" through the bleed line 28. The pressure in compartment "d" will drop from 40 to 35 and finally to 30 p. s. i. while the pressure in compartment "a" will increase from 20 to 25 and then level off at 30 p. s. i. in balance with the pressure of compartment "d." At this point reference to Figure 6 discloses that diaphragm A has rotated to a slot 26 and that spaced slot 26 is now midway between diaphragms D and E. A slight rotation of the rotor provides the situation illustrated in Figure 7 where compartment "d" at 30 p. s. i. is now directly connected by duct 28 to compartment "h" at 10 p. s. i., thereby again permitting the pressure in sector "h" to build up from 10 to 15 and finally to 20 p. s. i., while the pressure in compartment "d" continues to drop from 30 to 25 and finally to 20 p. s. i. where it is in balance with the pressure of compartment "h" as originally illustrated in Figure 3.

The radial sealing members 27 that extend axially of the rotor into the space between the diaphragms and the edge of each end or sector plate 21 should be of a size sufficient to bridge over each slot 26 to preclude additional leakage during the interval a sealing member is moving past a slot.

It will be apparent that an additional bleed line properly oriented with reference to the spaced compartments will provide another stage of pressure intermediate the high air pressure and the lower pressure gas and that an additional bleed line will even more reduce the entrained and the direct leakage. It has been determined that a bleed system as defined herein which equalizes the pressures of entrained fluid reduces entrained leakage by an amount represented by the formula $$\text{Leakage reduction} = \frac{2n}{1+2n}$$

where "n" is the number of equalizing bleed pipes.

In addition to reducing the amount of air compressed in each compartment intermediate the high and low pressure sides of the rotor, the direct air leakage between the air and gas sides will be reduced because of the reduced pressure differential between adjacent sectors. Furthermore a substantial portion of the air carried beyond the air duct 18 is returned to the sectorial compartments in which a lower pressure exists, and a quantity of air is thereby carried back to the main air stream. The heat imparted to this air is recovered as is the work of compression.

What is claimed is:

1. In heat exchange apparatus or the like having a cylindrical rotor divided by radial partitions into sector shaped compartments carrying heat transfer material, and a housing surrounding the rotor and provided at opposite ends with sector plates formed with circumferentially spaced apertures for the flow of heating gases and air to and through the heat transfer material carried by the rotor; radial sealing members cooperating with imperforate portions of said end plates to preclude fluid flow between adjacent compartments; circumferential sealing means mounted on end edges of the rotor to preclude fluid flow through the space between the rotor and rotor housing; circumferentially displaced slots formed in the sector plate to provide means for equalizing the pressure of the fluids entrained in the sector shaped compartments which lie intermediate the circumferentially spaced apertures, said slots being displaced circumferentially whereby one slot is substantially midway between a pair of adjacent radial partitions while the other of said slots is in axial alignment with a single radial partition; and means providing a fluid passageway between slotted portions of the sector plate thereby affording communication between compartments in alignment with said slots.

2. A heat exchange apparatus as defined in claim 1 wherein the circumferentially displaced slots are disposed in radial alignment with the radial sealing members.

3. A heat exchange apparatus as defined in claim 1 wherein the axial edge of each radial sealing member is at least as wide as each of the circumferentially spaced slots in the sector plate.

4. A heat exchange apparatus as defined in claim 1 wherein the axial edge of each radial sealing member sequentially bridges each slot in the sector plate when the rotor moves said sealing members into axial alignment with said slots.

5. A heat exchange apparatus as defined in claim 1 wherein the sector plate is adapted to cover at least two sector shaped compartments on each side of the spaced air and gas apertures whereby a single pair of slots will provide two zones of fluid pressure intermediate the high pressure air and the lower pressure gas.

6. A heat exchange apparatus as defined in claim 5 wherein the circumferentially spaced slots are disposed substantially midway between sides of spaced portions of said sector plate.

References Cited in the file of this patent
UNITED STATES PATENTS

| | | |
|---|---|---|
| 2,540,733 | Holm | Feb. 6, 1951 |
| 2,681,209 | Mudersbach | June 15, 1954 |

FOREIGN PATENTS

| | | |
|---|---|---|
| 671,882 | Great Britain | May 14, 1952 |